United States Patent [19]

Yanagawa et al.

[11] Patent Number: 5,798,155
[45] Date of Patent: Aug. 25, 1998

[54] BEARING MATERIAL AND ITS MANUFACTURING METHOD

[75] Inventors: Chuichi Yanagawa; Eigoro Tsukagoshi, both of Tokyo, Japan

[73] Assignee: Yanagawa Seiko Co., Ltd., Tokyo, Japan

[21] Appl. No.: 255,676

[22] Filed: Jun. 8, 1994

[30] Foreign Application Priority Data

Jun. 11, 1993 [JP] Japan ................. 5-140521

[51] Int. Cl.$^6$ ................. F16C 33/20
[52] U.S. Cl. ................. 428/35.8; 428/35.9; 428/36.91; 428/422; 428/461; 384/221; 384/222; 384/276; 384/296; 384/300; 384/908; 384/912; 138/141; 138/143
[58] Field of Search ................. 428/35.8, 35.9, 428/36.8, 36.91, 461, 465, 422, 131, 132, 134, 133, 136, 138, 161, 167; 138/140, 141, 143, 147, 148; 384/299, 300, 221, 222, 276, 295, 296, 297, 298, 908, 909, 912

[56] References Cited

U.S. PATENT DOCUMENTS

| | | | |
|---|---|---|---|
| 2,937,054 | 5/1960 | Rockafield | 384/222 |
| 3,494,676 | 2/1970 | Compton | 384/222 |
| 4,109,975 | 8/1978 | Mattson | 384/222 |
| 4,277,118 | 7/1981 | McCloskey | 384/300 |
| 4,826,192 | 5/1989 | Borromeo | 428/35.8 |
| 4,923,761 | 5/1990 | Shindo | 384/912 |
| 4,988,548 | 1/1991 | Takemura et al. | 428/368 |
| 5,217,771 | 6/1993 | Schmanski et al. | 428/36.9 |
| 5,264,262 | 11/1993 | Igarashi | 428/36.91 |
| 5,344,678 | 9/1994 | Kajiwara et al. | 428/36.91 |
| 5,356,681 | 10/1994 | Ichikawa et al. | 428/36.9 |
| 5,364,682 | 11/1994 | Tanaka et al. | 384/912 |
| 5,385,767 | 1/1995 | Noguchi | 428/36.91 |

FOREIGN PATENT DOCUMENTS 0176215  7/1990  Japan.

Primary Examiner—Rena Dye

[57] ABSTRACT

Composite material 19 comprising outer member 17 having ring form section and inner member 18 mounted into said outer member so as to form a unitary construction, wherein inner surface 24 of said outer member 17 and outer surface 22 of said inner member 18 are at least partially opposed to each other through a gap δ and wherein said members 17, 18 are joined together by means of anaerobic adhesives filling said gap δ.

12 Claims, 6 Drawing Sheets

BEARING MATERIAL AND ITS MANUFACTURING METHOD

TECHNICAL FIELD

The present invention relates to composite material having two layer compositions of different materials and to the manufacturing method of said composite material. More specifically, this invention relates to said type of composite material suitable for lubricationless bearings of comparatively small diameter having fluorine resin applied on the inner surface of metallic members, and to the manufacturing method thereof.

BACKGROUND OF INVENTION

In general, lubricationless bearings called Dry Bearings using no lubricant are often used in the rotating and sliding parts of smaller apparatuses such a scassettetape recorder, videotape recorder and the like due to no pollution by lubricant and simple structure of this type of bearings. Particularly, the lubricationless bearings using any suitable bearing material such fluorine resin on the rotating or sliding parts thereof are most preferred due to the low friction coefficient of the used bearing material.

FIG. 9 is a longitudinal cross-section view of such a lubricationless bearing 1 used generally. This lubricationless bearing 1 comprises a cylinder of material 2 which is made from a rod or pipe of fluorine resin having a low friction coefficient, for example polytetrafluoroethylene(referred to as PTFE hereinbelow) by cutting into determined size and shape. However, this type of lubricationless bearing 1 has to have a comparatively larger wall thickness owing to the low mechanical strength of its material 2 of PTFE resin, for example a wall thickness of 1.5 mm or more for its internal diame-ter of 3 mm. Accordingly, a lubricationless bearing 1 having higher diameter needs to use a higher quantity of high-price PTFE with higher cost. Since the wall thickness of PTFE resin is higher, the deformation of resin for applied loads becomes larger when the resin is used at a high PV value. Further, heat generated due to the relative movement between said PTFE resin and rotating shaft not shown is accumulated within said resin to cause a considerable heat expansion, so that the clearance between said resin and said shaft has had to be larger.

Further, said heat generated by relative movement between the lubricationless bearing 1 and the shaft causes softening of the resin and the increase of abrasion thereof thereby to shorten the life thereof.

For the purpose of eliminating the above described disadvantages, lubricationless bearings 4 are used nowadays which are produced from composite material 3 as shown in FIG. 10. The composite material 3 comprises a flat steel plate 5 covered by a sheet of fluorine resin 6 adhering thereon. Said composite material 3 is cut or blanked into determined size and are then rounded into pipe form thereby to obtain lubricationless bearings 4 of approximately cylinder form having a slit 7 therein. In the lubricationless bearings 4 consisting of said composite material 3, adhesives belonging to epoxy resin having high heat resistance and high adhering strength are used as adhesive member adhering fluorine resin 6 on steel plate 5. However, in the case of using epoxy resin adhesives for this purpose, when manufacturing the lubricationless bearings 4 having smaller radius of curvature or small diameter, the joining surface 8 between steel plate 5 and fluorine resin 6 may be broken due to the elongation as low as 1–2% of epoxy resin adhesives at the rounding operation after the adhering operation.

Therefore, a cylindrical inner member 12 of bearing material 11 such as fluorine resin having a desired interference is fitted into a ring-form outer member 10 of metallic material 9 thereby to form a composite material 13. Said composite material 13 is then worked into desired shape to obtain lubricationless bearings 14.

However, in the case of the above described lubricationless bearings 14, the operation of inserting an inner member 12 having interference into an outer member 10 is very difficult except the members 10,12 having short axial length, even substantially impossible for the members having long axial length. Further, the adhesives applied on any one of said members 10,12 may be peeled off at the inserting operation.

Therefore, another manufacturing method has been proposed wherein a long inner member 12 is first freely inserted into a long outer member 10, and the outer member 10 is then drawn thereby to obtain a unit.

However, in this method of manufacturing, a camber of about 10 mm for unit length of 1 m is generated. When a composite material 13 having such a camber is worked continuously in a working machine such as automatic lathe, one end of said long composite material 13 is chucked for rotating movement, so that the other end of said composite material 13 is caused to rotate in an eccentric manner with the resulting vibration thereof. Thus, since a long composite material 13 is to be worked in its vibration state, a high working precision can not be obtained. For obtaining a higher working precision in this case, the long composite material 13 must be cut into a plurality of short pieces which are then worked. This may bring about dispersion of qualities, increased cost and higher working technics and apparatus therefor.

In the case of using said lubricationless bearings 14 for parts having smaller diameter such as for example tape guide roller of video tape recorder, higher size precision is required, and in addition manufacturing using long composite material 13 is substantially impossible as described above, so that working process becomes complicated with increased economical burden.

Further, when using fluorine resin as bearing material 11 of inner member 12 in the lubricationless bearings 14 in which inner member 12 is inserted into outer member 10 without use of adhesives, the inner member 12 is inserted into the outer member 10 after firstly cutting these members 10,12 into short pieces because of the impossibility of inserting operation of long sized members. In this case, the fitting power (release load) is low between fluorine resin (inner member 12) and outer member 10 due to low mechanical strength and low friction coefficient of fluorine resin itself, so that inner member 12 consisting of fluorine resin may be freely released from outer member 10 because of thermal cycles in use (repetition of normal state and heated state caused by frictional heat). As a result, polyacetal resin is often used in place of fluorine resin as bearing material 11.

When using polyacetal resin as bearing material 11 of tape guide rollers of for example video tape recorder for business use rotating at a very high speed, stick slips are generated with generation of vibration and noise resulting in release of inner member 12 inserted into outer member 10 due to the heat cycle phenomenon described above. As a means for preventing such a release of inner member 12, release prevention means 15 as shown in FIG. 14 having a larger diameter than the inner diameter of outer member 11 is formed on the inner surface thereof and the outer surface of inner member 12 is forced into said release prevention means 15. But the formation of such release prevention means 15 on the inner surface of outer member 10 having small diameter (about 3.0 mm) requires very high technics and complicated process with resulting economical burden.

Further, when using polyacetal having friction coefficient two times larger than that of fluorine resin as bearing material 11 of tape guide roller, the inner diameter of inner member 12 having a not shown shaft inserted therein had to be about 1.2 mm for the purpose of preventing said stick slip phenomenon (that is for decreasing the sliding velocity), and the outer diameter of the shaft used had to be also decreased up to about 1.2 mm. Such working of inner diameter of inner member 12 up to the order of 1.2 mm and of outer diameter of corresponding shaft also up to about 1.2 mm requires very high technics and causes decrease of mechanical strength of shaft, resulting in low productivity (low workability) and larger economical burden. Accordingly, it has been desired from the view point of productivity to have an inner diameter of at least 2.0 mm for inner member 12 by using fluorine resin as bearing material 11.

SUMMARY OF THE INVENTION

Accordingly, for the purpose of eliminating the above described drawbacks of heretofore known bearings, it is the object of the invention to provide a reliable composite material having a simple structure which can attach inner member and outer member with each other to form a unitary construction.

In the composite material comprising outer member having ring form section and inner member mounted into said outer member so as to form a unitary construction according to claim 1, inner surface of said outer member and outer surface of said inner member are at least partially opposed to each other through a gap, and said members are joined together by means of anaerobic adhesives filling said gap.

In the composite material according to claim 1, said outer member and said inner member have each a long length.

In the composite material according to claim 1 or 2, at least one of said members is made from metal and the other member is made from fluorine resin.

In the method for manufacturing of composite material comprising outer member having ring form section and inner member mounted into said outer member to form a unitary construction according to claim 4, said method comprising the first step of forming respectively said outer member and said inner member so as to form at least partially a gap between opposed surfaces of said outer member and said inner member, and the second step of filling said gap with anaerobic adhesives after said members were assembled together.

In the method according to claim 4, wherein said outer member and said inner member have each a long length.

In the method according to claim 4 or claim 5, wherein at least one of said members is made from metal while the other member is made from fluorine resins.

Accordingly, it is possible according to the present invention to easily mount inner member into outer member at the ambient temperature to form a reliable high-quality composite material even if which has short length or long length, with advantages such as increase of productivity (workability) and decrease of manufacturing cost.

BRIEF DESCRIPTION OF THE DRAWINGS

For a better understanding of the present invention, reference is made to the following detailed descriptions of exemplary embedments thereof, taken in conjunction with the accompanying drawings, in which.

DETAILED DESCRIPTIONS OF EXEMPLARY EMBODIMENTS

With reference to FIGS. 1 to 8, there are illustrated various embodiments of lubricationless bearings using composite material according to the invention.

Figure 1:
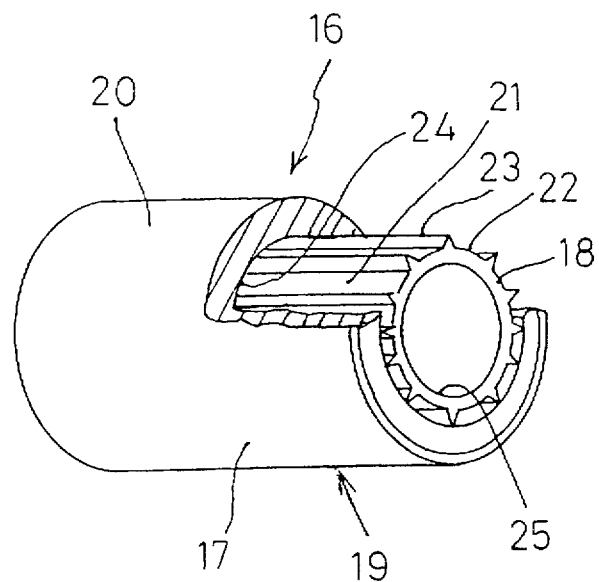
FIG. 1 is a partly broken-out perspective view of essential portion of an embodiment of composite material according to the invention used in a lubricationless bearing.
Figure 2:
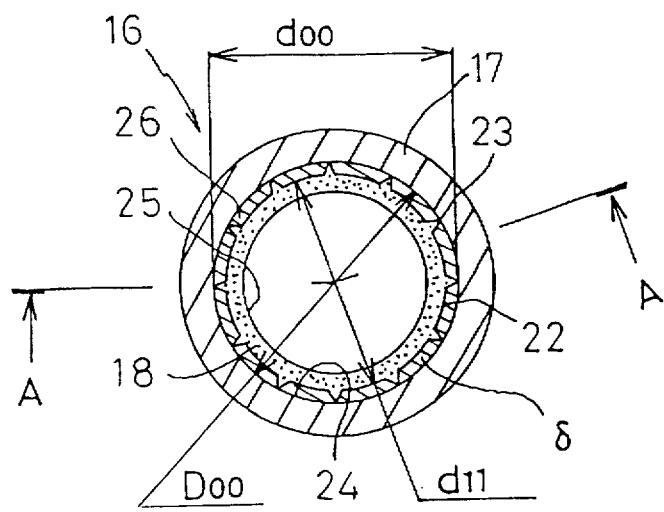
FIG. 2 is a cross-sectional view of the essential portion shown in FIG. 1.
Figure 3:
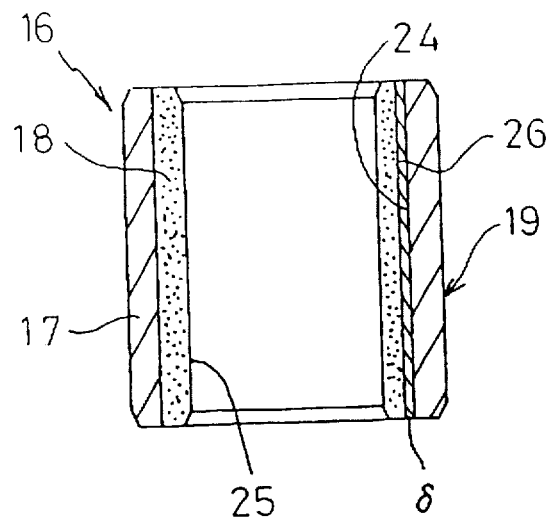
FIG. 3 is a longitudinal section view taken along the line A—A in FIG. 2.
Figure 4A:
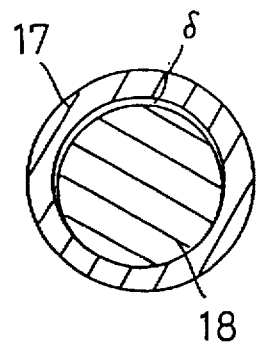
FIG. 4a to e are views similar to FIG. 2 for showing various forms of gaps.
Figure 4B:
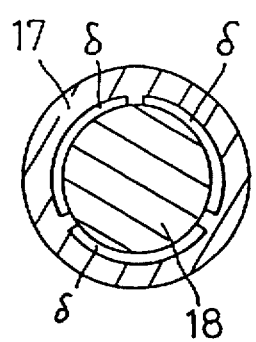
Figure 4C:
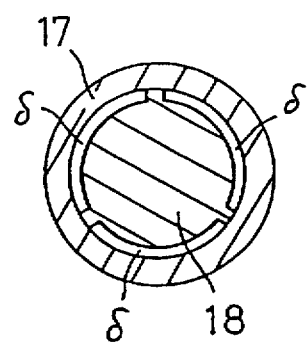
Figure 4D:
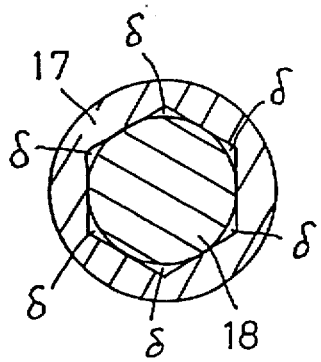
Figure 4E:
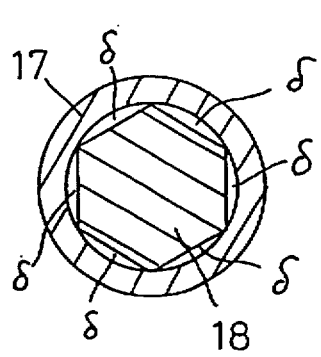

FIG. 1–3 show the first embodiment of lubricationless bearing using the composite material according to the present invention, wherein FIG. 1 is a partially broken-out perspective view, FIG. 2 being a cross-sectional view of FIG. 1, FIG. 3 being a longitudinal section view taken along the line A—A, and FIG. 4 being cross-sectional views showing various gap forms.

As shown in FIGS. 1–3, the lubricationless bearing 16 according to the present invention comprises a composite material 19 consisting of outer member 17 and inner member 18. Said outer member 17 is formed in cylindrical form from a desired metal 20, stainless steel in this embodiment, while said inner member 18 is formed in approximately cylindrical form from fluorine resin 21, for example PTFE resin solely or mixed with a suitable quantity of filler, for example glass fiber, carbon, graphite, molybdenum, carbon fiber or their combination in order to increase the friction resistance thereof.

A plurality of (12 in this embodiment) axial projections 23 having each angle section projecting radially outward are formed on the outer surface 22 of said inner member 18. The maximum outer diameter D00 binding the summits of diametrically opposed projections 23 is defined approximately equal to the inner diameter D00 of inner surface 24 of said outer member 17. Further, the diametrically inner surface of said inner member 18 is formed as a moving surface 25 having circular cross section for relative movements such as rotation, sliding or oscillation with respect to not-shown shaft and the like.

Between the inner surface 24 of outer member 17 and the outer surface 22 of inner member 18, there is formed a suitable gap δ by means of projections 23 as shown in FIG. 2.

Said gap δ is filled with anaerobic adhesives 26. This anaerobic adhesives 26 adheres firmly said outer member 17 to said inner member 18 to form a unit construction of composite material 19.

Said anaerobic adhesives 26 are based on dimethacrylate and have characteristics such as air shutting-off as well as polymerization and hardening by the presence of metallic ion. In this case, the viscosity of the anaerobic adhesives 26 can be selected from the scope of several tens and several thousands of cp according to the design concept under the consideration of thickness and length in axial direction of said δ and adhesive strength of anaerobic adhesives (in general, the thinner the thickness of adhesives layer is, the larger the adhesive strength is, and the lower the viscosity is, the lower the adhesive strength is). Further, the ultraviolet type of adhesives can be used as anaerobic adhesives 26. In the case of joining any non-metallic material such as resins having no metallic ion therein, any primer composition including metallic ion can be applied on the substitute of the non-metallic material. In the embodiment according to the present invention, a primer composition (not shown) has been applied on the inner member 18 consisting of fluorine resin.

Further, the cross-section of said projections 23 is not limited to the angle section as shown in the embodiment, but it may be semi-circular section and any other suitable form. The number of projections 23 is also not limited to the number in the embodiment, so long as a plurality of projections 23 are used. Further, the projections 23 can be distributed in spiral form or partially on the outer surface 22 of inner member 18, as necessary.

Further, said δ is not only formed by said projections 23 as described above, but can be made by any means for forming a suitable δ at least partially between the opposed surface of outer member 17 and inner member 18, for example free insertion of these members 17,18, suitable groove/grooves on the inner surface of outer member 17 or/and the outer surface of inner member 18, polygonal cross-section of the inner surface of outer member 17 combined with inscribed circular cross section of the outer surface of inner member 18, or any combination thereof, various examples of such forms of said δ are shown in FIG. 4a to e.

The manufacturing method of and the effects brought about by the composite material according to the present invention are now described with respect to an embodiment shown in FIGS. 1–7.

Figure 5:
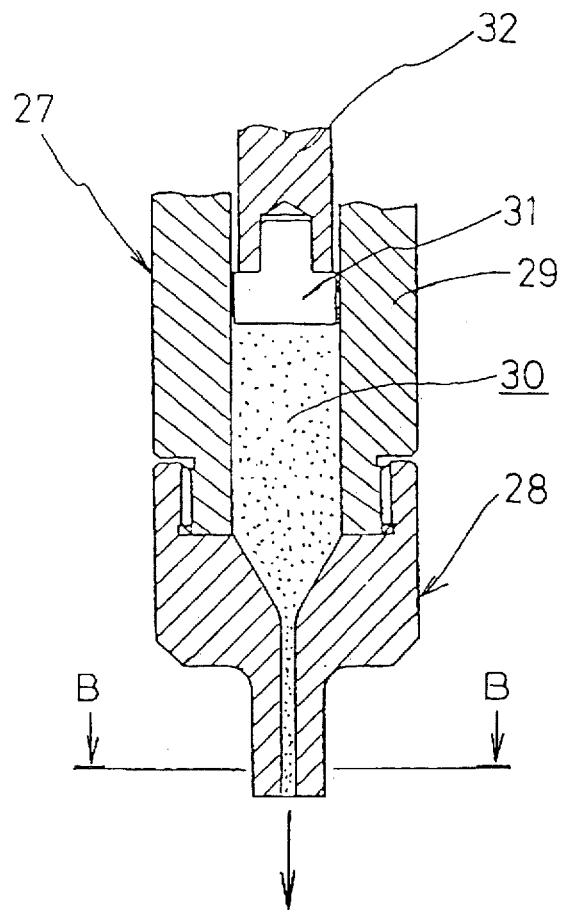
FIG. 5 is a longitudinal section view showing the essential portion of a forming apparatus or mold of inner members according to the manufacturing method of composite material according to the invention.
Figure 6:
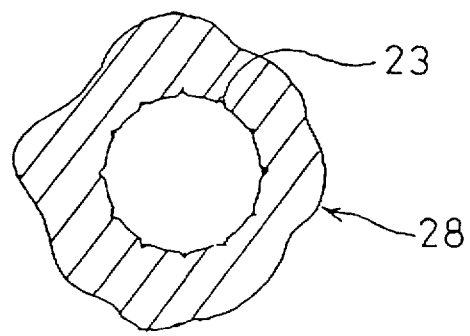
FIG. 6 is an enlarged cross-sectional view taken along the line B—B in FIG. 5.
Figure 7:
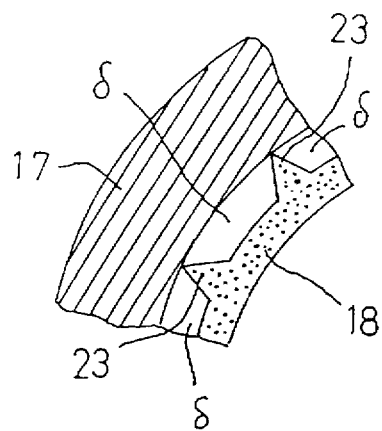
FIG. 7 is a partial enlarged cross-sectional view showing of inner member engaged with outer member.

FIG. 5 is a longitudinal cross-section showing the essential portion of an embodiment of apparatus for forming inner member 18. FIG. 6 is an enlarged cross-section taken along B—B line of FIG. 5. FIG. 7 is a partial enlarged cross-section of the construction wherein inner member 18 is mounted in outer member 17.

First with respect to outer member 17, it can be formed from seamless pipe or seamed pipe of stainless steal and the like through a drawing process and the like well known process into a pipe having outer diameter of 4.1 mm, inner diameter D00 of 3 mm and length of about 2.5 m.

Inner member 18 can be formed by extrusion of paste material through suitable forming apparatus 27 and mold 28. More specifically, raw material 30 of said fluorine resin 21 (PTFE resin) charged into cylinder 29 is extruded in the arrow direction shown in FIG. 5 by means of ram head 31 of ram 32 thereby to form a long rod having a length of 2.5 m, said rod having outer diameter d11 of its outer surface 22 of a little less than 3 mm and maximum outer diameter d00 of the same outer surface 22 which is approximately equal to inner diameter D00 of outer member 17, and said rod having further thereon circumferentially equally distributed 12 projections 23 each extending radially and having angle section of 0.1 mm height.

The lengths of said outer member 17 and inner member 18 were selected at 2.5 m for the purpose of adapting these members to the material feeding device on the machine tool such as automatic lathe used later for manufacturing of short pieces of lubricationless bearings 16. Thus, the length of said members is not restricted to 2.5 m.

Concerning to the method for inserting inner member 18 into outer member 17, the inner member 18 formed as described above is first subjected to a suitable surface processing such as well known etching process thereby to processing of fluorine resin 21, and to a painting process by a primer composition including metallic ion. Thereafter, the inner member 18 thus prepared is inserted into the outer member 17.

In the inserting operation, inner member 18 is mounted into outer member 17 while the inner surface 24 of outer member 17 is in contact with the apex of each projection 23 formed on the outer surface 22 of inner member 18. Since the diameter of the inner surface 24 of outer member 17 and the diameter between the apexes of opposed projections are made equal to each other, and since a suitable gap δ is formed between the inner surface 24 of outer member 17 and the outer surface 22 of inner member 18, the contact area between these members is small so that the inserting operation can be easily carried out.

As it is clear from the above description, the effect reduce the contact area between the inner surface 24 of outer member 17 and the summits of projections 23 of inner member 18 as well as to cause a certain collapse of the summits of projections 23 thereby to reduce the resistance in the inserting operation as compared to the heretofore known methods. Further, a suitable interferences can be provided between the inner surface 24 of outer member 17 and the summits of projections 23 of inner member 18 provided that said gap is formed therebtween. Further, suitable gaps can be provided therebetween so as to freely insert inner member 18 into outer member 17 thereby to most reduce resistance in the inserting operation.

With respect to the method for fixing outer member 17 and inner member 18 to each other, anaerobic adhesives 26 are charged by pressure or by suction into the gap δ formed. The anaerobic adhesives 26 thus charged are shut off from the outer air while at the same time it is caused to rapidly polymerize and harden at ambient tem-perature owing to metallic ion from outer member 17 consisting of stainless steal, thereby to strongly fix outer member 17 and inner member 18 to each other. It is clear that use of anaerobic adhesives 26 allows for an easy and reliable fixing of these members at the ambient temperature.

Further, when it is desired to accelerate the hardening speed of anaerobic adhesives 26, it can be heated to a temperature of about 100° C. Further, the anaerobic adhesives 26 used have preferably a low shrinkage rate so as to prevent the generation of efforts at the joining portion. Further, where it is probable that the anaerobic adhesives 26 adheres to the unnecessary surface which is not shut off from outer air, for example to the outer surface of outer member, an ultraviolet hardening type of anaerobic adhesives 26 is preferably used thereby to harden the adhesives 26 which have stuck to unnecessary portions.

As described above, it is possible according to the present invention to easily mount inner member 18 into outer member 17 to form a reliable high-quality composite material 19.

Further according to the present invention, the heretofore used drawing process is not used when combining outer member 17 and inner member 18 thereby to eliminate any axial camber of composite material 19. Consequently, when carrying out machining process such as continuous cutting on machine tool such as automatic lathe, no vibration in composite material 19 is generated thereby to obtain a high machining precision.

When manufacturing short pieces of lubricationless bearing 16 from long composite material 19, said composite material 19 can be continuously worked into the desired size, for example inner diameter of 2.0 mm, outer diameter of 4 mm and length of 8 mm, by predetermined working process such as boring, beveling and cutting on a suitable machine tool having automatic material feeding device, thereby to easily obtain lubricationless bearing of small diameter having a thin layer of fluorine resin 21 as inner member 18. In this lubricationless bearing 19, since the layer of fluorine resin 21 is thin, heat generated through the friction with shaft and stocked into the layer of fluorine resin 21 in use can be rapidly transferred into metallic material 20 as outer member 17, that is with increase of heat transfer. Therefore, increase of temperature in fluorine resin 21 can be maintained in a low level to prevent the decrease of compression strength of fluorine resin 21 and to cause lubricationless bearing 16 to endure any high PV values.

Since lubricationless bearing 16 using fluorine resin 21 endure high PV values, lubricationless bearing 16 according to the present invention can be rotated at very high speed by means of tape guide roller without various disadvantages as in the case of lubricationless bearing 14 using polyacetal resin, such as for example generation of stick slip, that of vibration and noises and release of inner member 12 from outer member 10. Further, since fluorine resin 21 has a lower friction coefficient than that of polyacetal resin, the inner diameter of lubricationless bearing 16 according to the present invention can be 2.0 mm which is considerably larger than that of lubricationless bearing 14 using polyacetal resin, that is 1.2 mm. Accordingly, the shaft mounted in the inner diameter of 2.0 mm can have a con-siderably larger outer diameter, thereby to increase the mechanical strength of shaft used, with advantages such as increase of productivity (workability) and decrease of manufacturing cost.

Further, since fluorine resin 21 can be subjected to the surface processing called etching using metallic sodium and the like, inner member 18 consisting of fluorine resin 21 and outer member 17 consisting of metallic material 20 can thus be reliably joined together to form a unitary construction by means of anaerobic adhesives 26.

Further, since the layer of fluorine resin 21 can be thin as described above, variation of size of fluorine resin layer 21 due to thermal expansion caused by stocked heat described above can be maintained less than in the heretofore known technics, thereby to positively reduce the clearance between lubricationless bearing 16 and shaft. Such a reduced clearance brings about a higher bearing precision.

Then a release load test has been carried out wherein the release load of reference lubricationless bearings (according to heretofore known technics) comprising each inner member 12 fitted into outer member 10 provided with a release stopper 15 and having outer diameter of 4.0 mm, inner diameter of 3.0 mm and length of 8.0 mm,and that of lubricationless bearings (according to the present invention) having the same size as the above reference bearings were determined in the initial state before use and in the state after heat cycles at the same determining conditions. With regards to the heat cycle conditions, the reference bearings were subjected to alternating three cycles of room temperature and 120° C.×30 minutes while the lubricationless bearings according to the present invention were subjected to alternating three cycles of room temperature and 150° C.×30 minutes.

Figure 8:
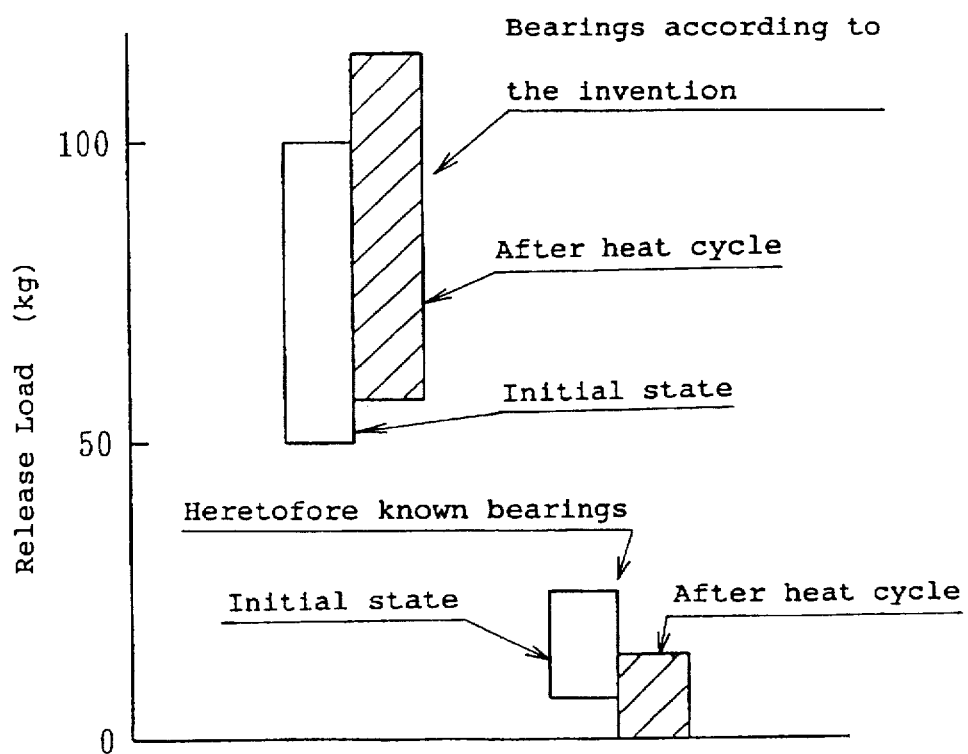
FIG. 8 is a graph showing the test results of release loads of lubricationless bearing according to the invention and heretofore known lubricationless bearing.
Figure 9:
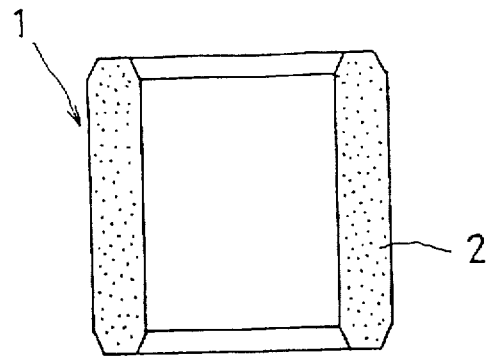
FIG. 9 is a longitudinal section view of composite material for common lubricationless bearing.
Figure 10:
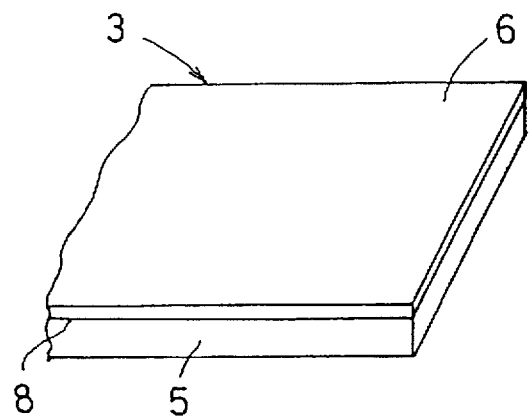
FIG. 10 is a perspective view showing a manufacturing step of common composite material.
Figure 11:
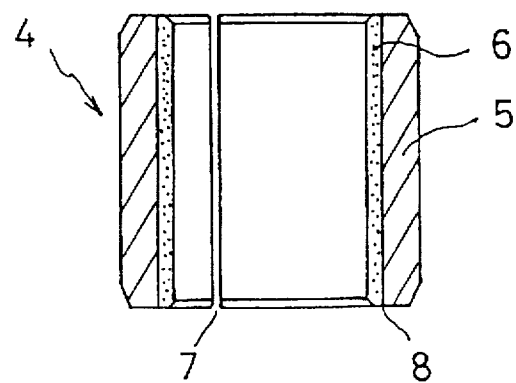
FIG. 11 is a longitudinal section view of common lubricationless bearing manufactured by the use of the composite material shown in FIG. 10.
Figure 12:
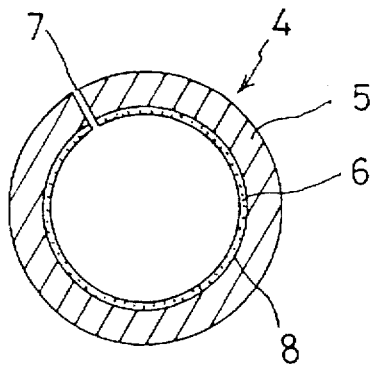
FIG. 12 is a cross-sectional view of composite material shown in FIG. 11.
Figure 13:
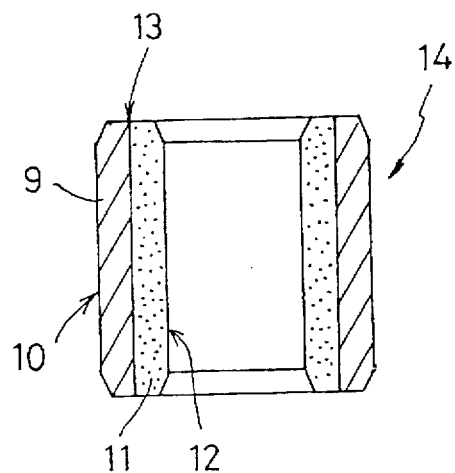
FIG. 13 is a longitudinal section view of another common lubricationless bearing.
Figure 14:
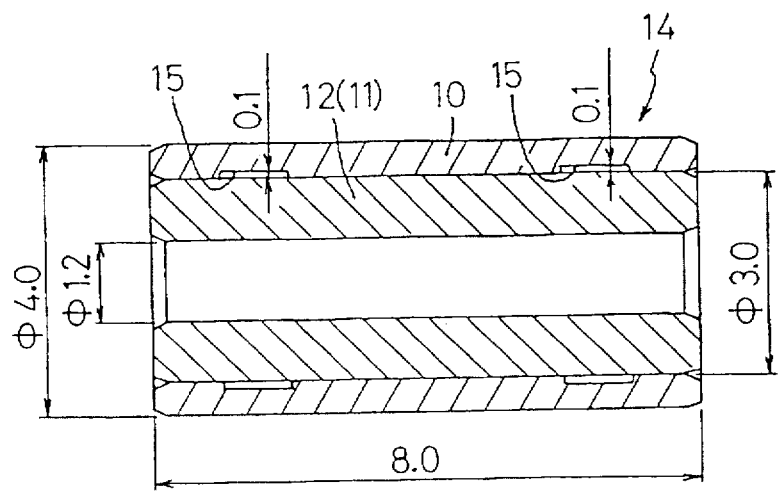
FIG. 14 is a longitudinal section view of a lubricationless bearing having a release preventing means formed thereon.

FIG. 8 shows the test results obtained. It is clear therefrom that release load before use was in the order of 8–25 Kg for the reference bearings and in the order of 50–100 Kg for the lubricationless bearings according to the present invention. Release load after heat cycles corresponding to use conditions was zero for the reference bearings, that is in some of them release occurred easily, while release load increases for the lubricationless bearing according to the present invention.

The reason of such an increase of release load in the composite material according to the invention is probably due to the fact that hardening of anaerobic adhesives 26 has progressed with heating.

The lubricationless bearings according to the invention have positively increased adhesive strength and stable functions for a long period, thereby to prevent the increase of economical burden and bring about the productivity. Further, while long sized composite material 19 has been used as raw materials in the above embodiments, a desired lengths of composite material can be also used.

Further, in the composite material 19 according to the invention, metallic layer 20 is used as outer member 17 while fluorine resin 21 is used as inner member 18, but fluorine resin 21 can be used as outer member 17 and metallic layer 20 can be as inner member 18. As for raw materials used in these members, other raw materials than those described above, for example ceramics and high-molecular materials such polyamids can be combined according to the specification of the products to be obtained. Further, when such a combination of raw materials is used, a primer composition containing metallic ion is applied on at least one of opposed surfaces of these raw materials.

For the purpose of increasing further the unitary quality (that is adhesive strength) of long sized composite material 19 according to the invention, inner member 18 is first inserted into outer member 17, thereafter outer member 17 is subjected to a drawing process and then the gap between these members is filled with anaerobic adhesives 26 to form a unitary composite material.

While the present invention has been described with reference to exemplary embodiments thereof, it will be appreciated by those skilled in the art that variations and modifications may be made thereto without departing from the spirit of the inventive concepts disclosed herein. All such variations and modifications are intended to fall within the scope of the claims appended thereto.

We claim:

1. A composite tubular bearing not requiring lubrication, comprising:
   a. a fluorine resin annular inner member;
   b. a metallic annular outer member;
   c. said inner and outer members having mutually facing respective outer and inner surfaces;
   d. one of said facing surfaces being cylindrical;
   e. said remaining facing surface having circumferentially spaced areas projecting towards and contacting said cylindrical surface at locations spaced circumferentially thereabout;
   f. anaerobic adhesive occupying the entirety of space separating said facing surfaces between said circumferentially spaced projecting areas.

2. The bearing of claim 1 wherein said resin is polytetrafluoroethylene.

3. The bearing of claim 1 wherein said inner member is homogeneous.

4. The bearing of claim 1 wherein said outer member is homogeneous.

5. The bearing of claim 4 wherein said inner member is homogeneous.

6. The bearing of claim 5 wherein said outer member is slit along the axis of the annulus to define a longitudinal gap extending the length of said annular member allowing air communication with said anaerobic adhesive occupying the entirety of space separating said facing surfaces between said circumferentially spaced projecting areas.

7. The bearing of claim 1 wherein said anaerobic adhesive is dimethacrylate and polymerizes and hardens in response to presence of metallic ion.

8. The bearing of claim 6 wherein said anaerobic adhesive is dimethacrylate and polymerizes and hardens in response to presence of metallic ion.

9. A composite tubular bearing not requiring lubrication, comprising:
   a. a polytetrafluoroethylene resin cylindrical inner member;
   b. a stainless steel cylindrical outer member;
   c. said inner and outer members having mutually facing, annularly disposed respective outer and inner surfaces;
   d. one of said facing surfaces being cylindrical;
   e. said remaining facing surface having circumferentially spaced areas projecting towards and contacting said cylindrical surface at locations spaced circumferentially thereabout;
   f. anaerobic dimethacrylate adhesive which polymerizes and hardens in response to presence of metallic ion occupying the entirety of space separating said facing surfaces between said circumferentially spaced projecting areas;
   g. wherein said outer member is slit along the axis of the cylinder to define a longitudinal gap extending the length thereof for allowing air communication with said anaerobic adhesive occupying the entirety of space separating said facing surfaces between said circumferentially spaced projecting areas.

10. The bearing of claim 9 wherein said inner member is homogeneous.

11. The bearing of claim 9 wherein said outer member is homogeneous.

12. The bearing of claim 11 wherein said inner member is homogeneous.

* * * * *